United States Patent [19]

Roberts et al.

[11] Patent Number: 4,972,441

[45] Date of Patent: Nov. 20, 1990

[54] ENHANCED PULSE TIME-OF-ARRIVAL DETECTOR

[75] Inventors: James L. Roberts, Seattle; John F. Richardson, Bellevue, both of Wash.

[73] Assignee: Honeywell, Inc., Minneapolis, Minn.

[21] Appl. No.: 274,639

[22] Filed: Nov. 17, 1988

Related U.S. Application Data

[63] Continuation of Ser. No. 785,111, Oct. 7, 1985, abandoned.

[51] Int. Cl.$^5$ ............................................. H04L 27/22
[52] U.S. Cl. ......................................... 375/95; 375/96; 364/728.03
[58] Field of Search ........................ 375/76, 94, 95, 96, 375/103; 364/728.03; 307/269, 362, 510, 518; 328/109, 110, 136; 377/20; 342/88, 195, 203; 329/311

[56] References Cited

U.S. PATENT DOCUMENTS

| | | | |
|---|---|---|---|
| 4,038,540 | 7/1977 | Roberts | 364/728 |
| 4,164,036 | 8/1979 | Wax | 364/724.09 |
| 4,267,595 | 5/1981 | Hernandez | 375/95 |
| 4,397,031 | 8/1983 | Weber | 377/20 |
| 4,401,987 | 8/1983 | Cyr | 342/88 |
| 4,606,050 | 8/1986 | Sekigawa et al. | 375/95 |

*Primary Examiner*—Benedict V. Safourek
*Attorney, Agent, or Firm*—Roger W. Jensen

[57] ABSTRACT

A detector for detecting a communication pulse in the presence of noise is disclosed having a transmitter for transmitting a communication pulse of carrier frequency having a main pulse portion and a pre-pulse portion, the pre-pulse portion being of substantially opposite phase to the main pulse portion, a receiver for receiving the communication pulse, a correlation signal circuit connected to the receiver for providing a correlation signal, the correlation signal having first and second slopes in response to the communication pulse, the second slope being steeper than the first slope, and a comparator connected to the correlation signal circuit for providing a pulse detection output signal when the correlation signal reaches a predetermined threshold, the threshold being set at level to detect the correlation signal at a point on the second slope.

4 Claims, 9 Drawing Sheets

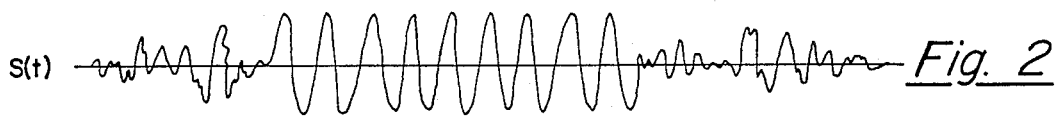
Fig. 2
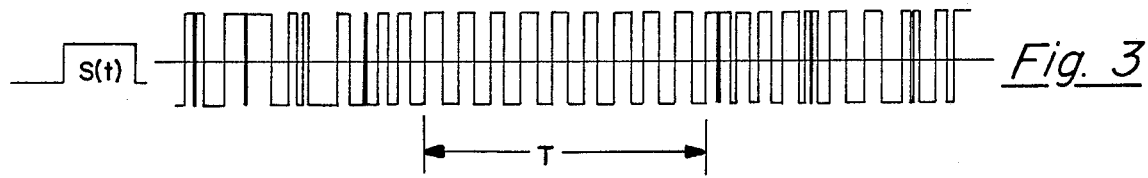
Fig. 3
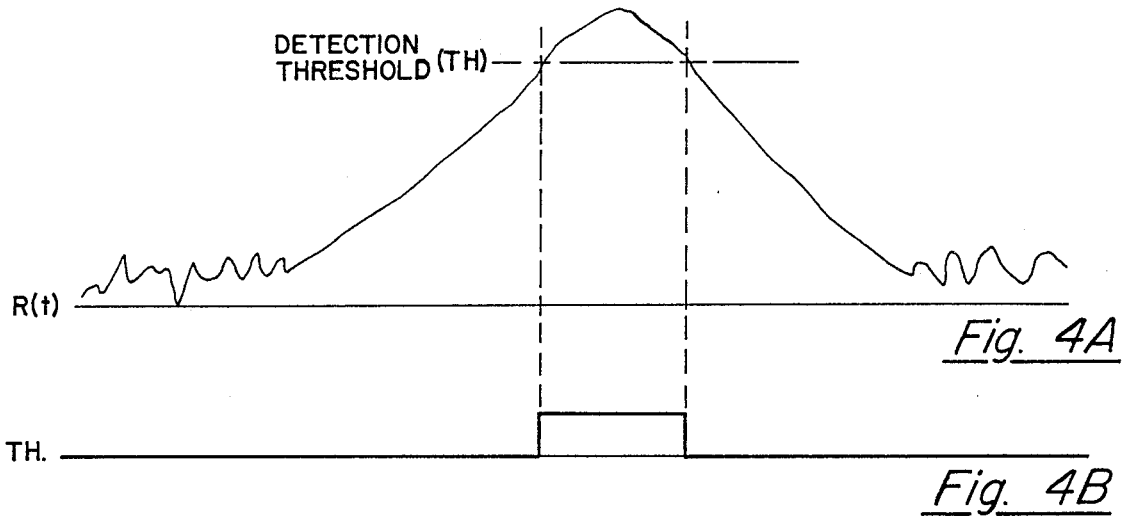
Fig. 4A
Fig. 4B
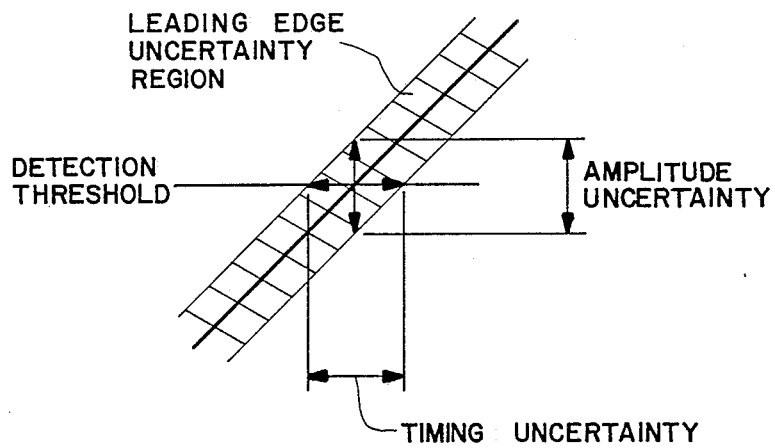
Fig. 6

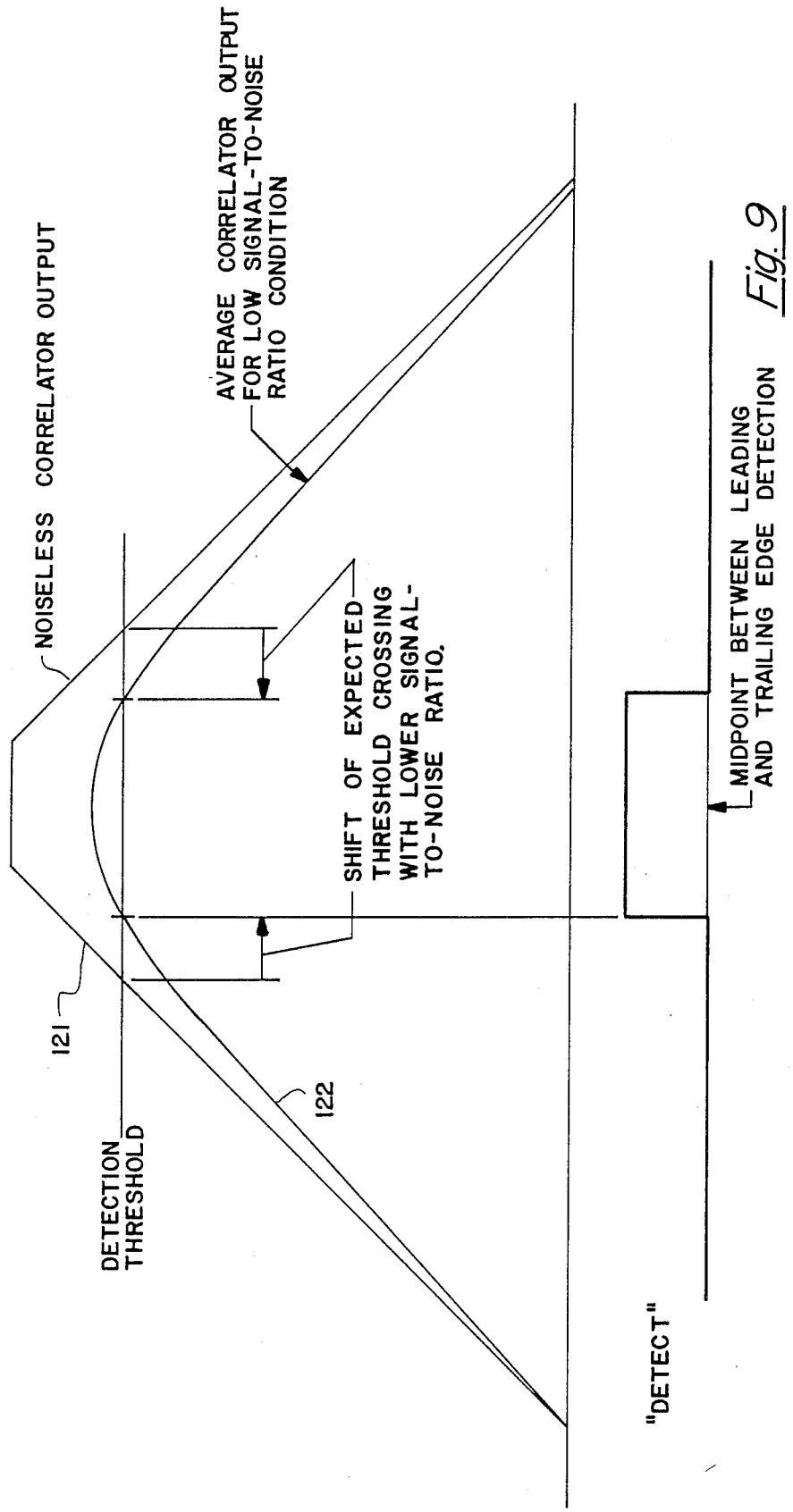

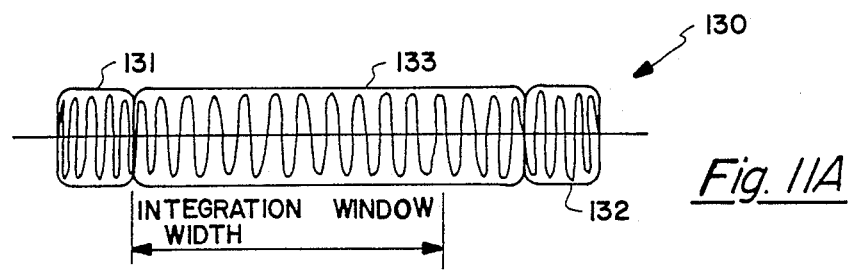
Fig. 11A
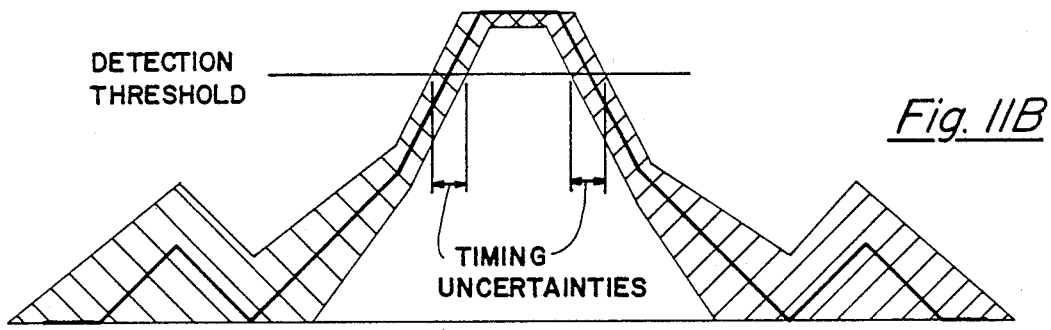
Fig. 11B
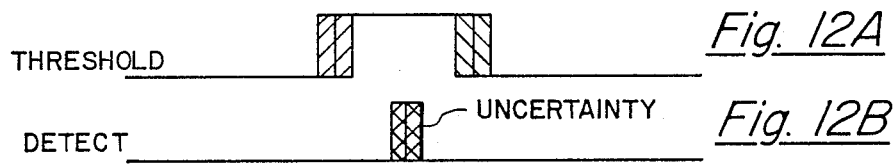
Fig. 12A
Fig. 12B
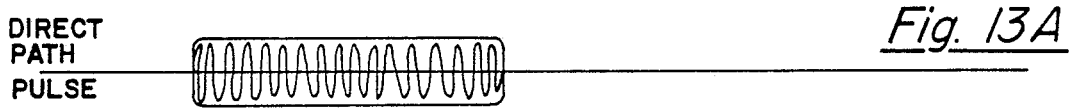
Fig. 13A
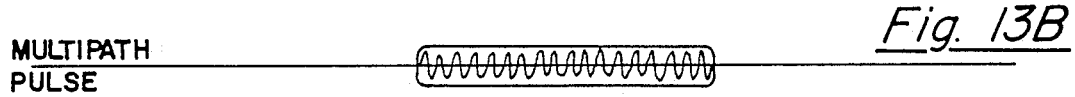
Fig. 13B
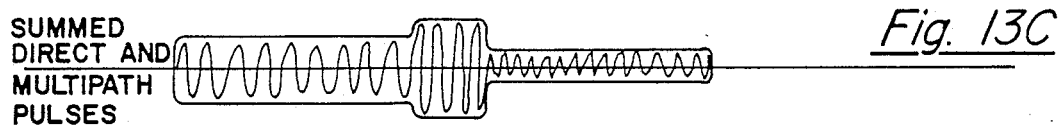
Fig. 13C
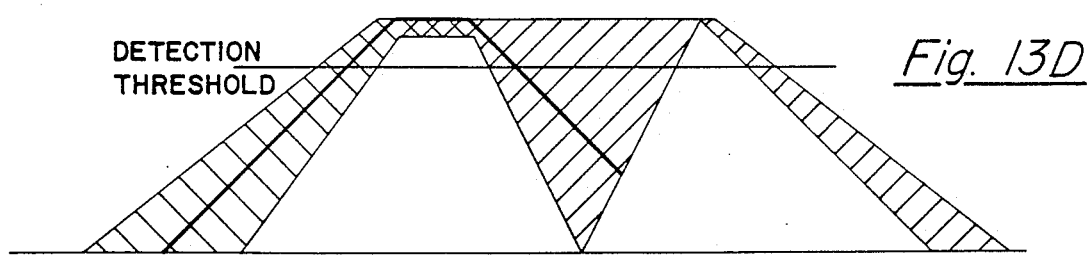
Fig. 13D

DIRECT PATH PULSE

MULTIPATH PULSE

SUMMED DIRECT AND MULTI-PATH PULSES

DETECTION THRESHOLD

ENHANCED PULSE TIME-OF-ARRIVAL DETECTOR

This application is a continuation of application Ser. No. 785,111, filed Oct. 7, 1985, now abandoned.

BACKGROUND OF THE INVENTION

The present invention relates to enhanced detection of pulses in the presence of noise and spurious signals.

Signal pulses of known carrier frequency are used in a variety of situations for communication, object detection, and object location, as well as for other purposes. To the extent that the signal pulses remain in relatively undistorted and of significantly higher amplitudes than background noise, pulse detection can be accomplished with relative ease and simplicity. However, there are many situations in which it is necessary to reliably detect communication pulses contaminated with random noise of significant amplitude relative to the amplitude of the communication pulse. In such situations, simple amplitude and/or frequency discrimination may not provide reliable pulse detection, and other more sophisticated detection are required.

One such technique is described in U.S. Pat. No. 4,038,540 issued to James L. Roberts and assigned to the same assignee as is the present invention. This patent discloses an apparatus for detecting a communication pulse of known carrier frequency, which pulse may be distorted by random noise, by correlating the received communication pulse with a reference signal having a repetition rate equal to the carrier frequency. Correlation is accomplished by multiplying the received communication pulse with each of quadrature components of the reference signal and sampling the product signal to provide binary sample pulse trains which are supplied to a pair of shift register accumulators. Reversible counters and associated logic determine the differences in the numbers of samples of non-corresponding binary values in each of the shift registers, and provide counts which are added to produce a moving correlation signal which indicates presence of a communication pulse when it exceeds a predetermined threshold.

The detection circuitry of prior art systems such as that shown in U.S. Pat. No. 4,038,540, have a time-of-arrival uncertainty, the extent of which is determined by the amount that the communication pulse is distorted by noise.

SUMMARY OF THE INVENTION

The present invention reduces this uncertainty by providing a detector for detecting a communication pulse in the presence of noise having a transmitter for transmitting a communication pulse of carrier frequency, the communication pulse having a main pulse portion and a pre-pulse portion, the pre-pulse portion being of substantially opposite phase to the main pulse portion, a receiver for receiving the communication pulse, a correlation signal circuit connected to the receiver for providing a correlation signal, the correlation signal having first and second slopes in response to the communication pulse, the second slope being steeper than the first slope, and a comparator connected to the correlation signal circuit for providing a pulse detection output signal when the correlation signal reaches a predetermined threshold, the threshold being set at a level to detect the correlation signal at a point on the second slope.

BRIEF DESCRIPTION OF THE DRAWINGS

These and other features and advantages will become more apparent from a detailed consideration of the drawings in which:

FIG. 2 shows a pulse such as that which is transmitted by the prior art system as shown in U.S. Pat. No. 4,038 540;

FIG. 3 shows the signal of FIG. 2 after it has been filtered and clipped by the prior art system;

FIGS. 4A and 4B show the correlation signal and the threshold signal provided by the prior art system as a result of the pulse shown in FIG. 2;

FIGS. 6 and 7 compare the timing uncertainty at the detection threshold for a correlation signal having the slope which is obtained from the prior art system and for a correlation signal having an increased slope;

FIGS. 9, 10A, and 10B show correlation signal diagrams useful in explaining how the time-of-arrival can be more accurately determined;

FIGS. 11A and 11B show the correlation signal generated in response to a communication pulse according to another aspect of the present invention;

FIGS. 12A and 12B show the threshold and detection pulses derived from the correlation signal shown in FIG. 11B;

FIGS. 13A-13D show how the prior art detection system responds to direct and multi-path pulses; and, FIGS. 14a-14d show how the present invention responds to direct and multi-path pulses.

DETAILED DESCRIPTION OF THE PREFERRED EMBODIMENT

Figure 1A:
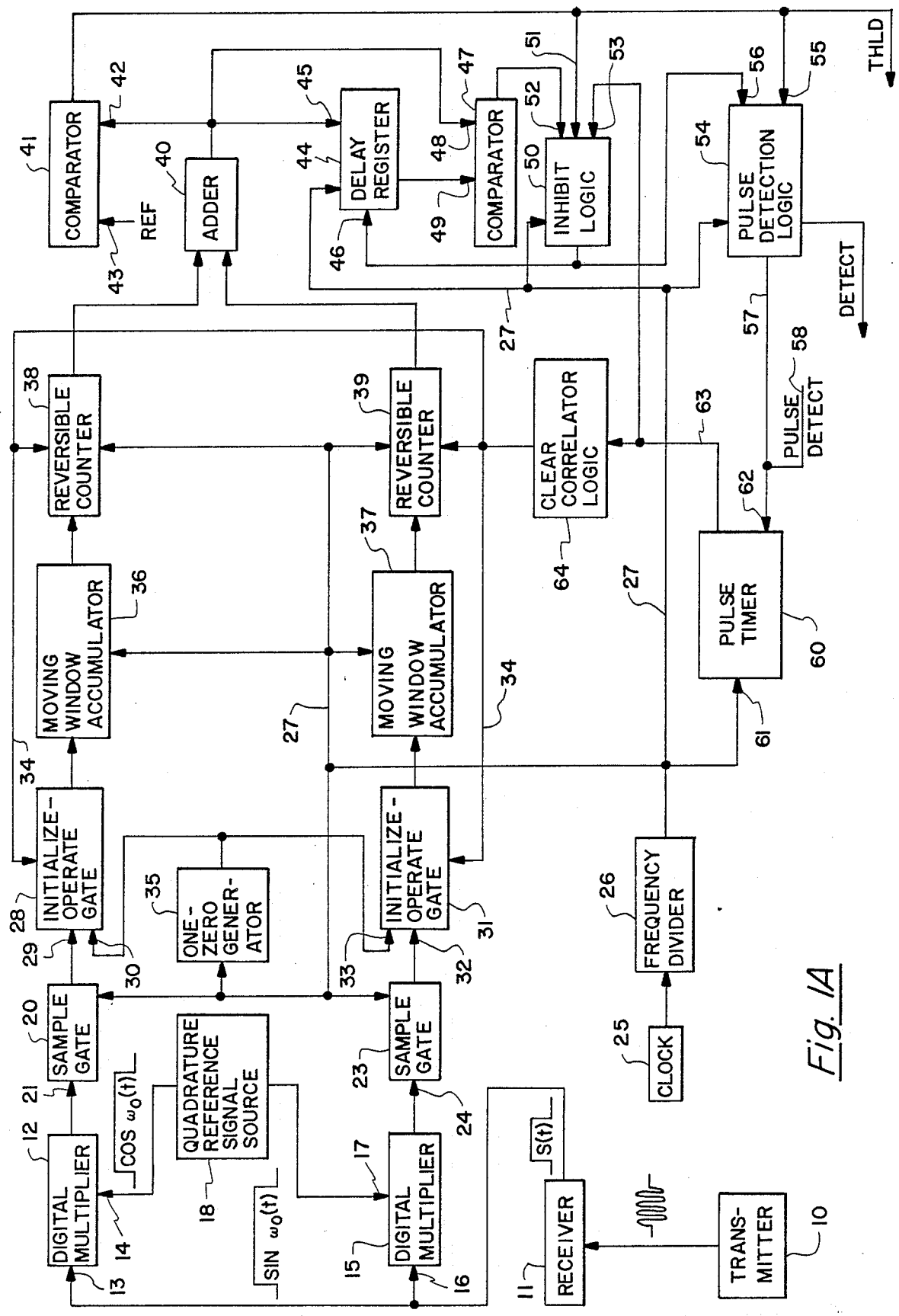
FIGS. 1A, 1B, and 1C show a schematic diagram of the detector according to the present invention.

In FIG. 1A, receiver 11 provides a clipped input signal S(t) to the inputs 13 and 16 of respective digital multipliers 12 and 15. Second inputs 14 and 17 of digital multipliers 12 and 15 respectively are supplied by quadrature reference signal source 18. Source 18 produces first and second substantially square wave signal $\cos\omega_0(t)$ and $\sin\omega_0(t)$. As apparent from the signal functions, these square wave signals are 90 degrees out of phase or in quadrature with one another. They also have a repetition rate equal to the carrier frequency of the signal pulse, and upper and lower values of 1 and 0. These signals may be considered quadrature components of a square wave reference signal.

Digital multipliers 12 and 15 may be respective EXCLUSIVE OR gates which will produce a low output only when both inputs have corresponding amplitudes, i.e. both 1 or both 0.

The outputs of digital multipliers 12 and 15 are supplied to sample gates 20 and 23 through respective input terminals 21 and 24. Sample gates 20 and 23, under control of clock pulses supplied by clock 25 through frequency divider 26, sample the outputs of digital multipliers 12 and 15 at a sample rate which is adequate to retain the desired information in the communication pulses, and produce first and second sample trains at their respective output terminals. Clock 25 and frequency divider 26 synchronize the operations of the various portions of the pulse detector.

The sample trains, which comprise uniformly spaced short duration pulses having values of either 1 or 0, are supplied to gates 28 and 31 through corresponding inputs 29 and 32. One-zero generator 35, driven by clock pulses from frequency divider 26, provide a second input to each of the gates 28 and 31 through corresponding second input terminals 30 and 33. Control line 34 to each of gates 28 and 31 controls which of the two inputs of each gate is connected to the respective gate output.

By way of example, it may be assumed that gates 28 and 31 each operate such that, in the absence of a signal from line 34, the sample train at its first input terminal will be transmitted to its output terminal. Conversely, if a signal is present at its control terminal connected to line 34, the signal at its second input (i.e. from one-zero generator 35) will be transmitted to its output terminal. During the actual pulse detection process, no signal is carried on conductors 34, thereby causing the first and second sample trains to be produced at the output terminals of gates 28 and 31 respectively. The pulses from one-zero generator 35 ar connected through gates 28 and 31 during an initialization operation of the pulse detector.

The output signals from gates 28 and 31 are supplied to moving window accumulators 36 and 37 respectively. The moving window accumulators, which may comprise shift registers, each having a predetermined number of storage locations, are under the control of the timing signal on conductor 27 and operate to accept the output signals from gates 28 and 31, and shift the signal serially to the accumulator output terminals. Accumulators 36 and 37 thus serve to define a window of fixed duration, typically less than the communication pulse, which duration is determined by the number of storage locations therein and the rate at which signals are shifted therethrough.

Accumulators 36 and 37 have associated therewith logic which produce a signal when the samples entering and leaving the accumulator have different values. Stated otherwise, the logic associated with each shift register produces a signal only when the relative number of 1's and 0's in the shift register is changing. It may further be observed that a change in the relative number of 1's and 0's in each shift register is indicative of a change in the degree of correlation between the received communication pulse and one of the quadrature components of the square wave reference signal.

The output signals of accumulators 36 and 37 comprise trains of samples having values of either 1 or 0. These samples are supplied to reversible counters 38 and 39 respectively, each of which is controlled by the signal on control line 34 and each of which receives clock pulses from divider 26. Counters 38 and 39 produce counts which are incremented or decremented by data signals received from accumulators 36 and 37. Accordingly, the magnitude of the count in counters 38 and 39 are representative of the difference in numbers of samples in accumulators 36 and 37 having 1 and 0 values. These counts are indicative of the degree of correlation between the received communication pulse and the quadrature components of the reference signal.

With reference to the operation of accumulator 36 and 37, it may be observed that noise will correlate with the reference signal in a random manner resulting in sample trains of 1's and 0's in random order. Accordingly, the differences in the numbers of 1's and 0's in the accumulator may vary slightly with time but, on the average, there will be no difference in the number of 1's and 0's in the accumulators due to noise. Consequently, counters 38 and 39 will respond to noise by maintaining an average count of 0. However, as the outputs of gates 28 and 31 contain components which relate more closely with the reference signal (i.e. as might be expected upon receipt of a communication pulse), a predominate number of 1's or 0's will be present in each accumulator. This predominance will be reflected in the counts in the counters.

The output counts from counters 38 and 39 are supplied to adder 40 which adds the counts to produce a moving correlation between the input signal and the reference signal. The moving correlation signal is supplied to comparator 41 through input terminal 42. Comparator 41 also has a second input terminal 43 which is supplied with a reference signal indicative of a correlation threshold representing a minimum degree of correlation chosen to characterize presence of a communication pulse. Comparator 41 compares the signals at input terminals 42 and 43 and produces an output signal when the moving correlation signal exceeds the threshold reference signal. The moving correlation signal is also supplied to a delay register 44 through an input terminal 45. Delay register 44 has a control terminal 46, a clock terminal, and an output terminal. Register 44 receives clock pulses through conductor 27, and is operable to delay by one clock pulse the signal received through input terminal 45 provided an enabling signal is present at control terminal 46. If the enabling signal is present at control terminal 46, the delay signal appears at the output terminal.

The undelayed moving correlation signal and the delayed moving correlation signal as produced by delay register 44 are supplied to a second comparator 47 through input terminals 48 and 49 respectively. Comparator 47 has an output terminal at which a signal is produced indicating whether the undelayed moving correlation signal is larger or smaller than the delayed moving correlation, thus detecting peaks in the correlation signal.

Reference numeral 50 identifies inhibit logic having an input terminal 51 connected to receive the output signal of comparator 41, an input terminal 52 connected to receive the output signal of comparator 47, an input terminal 53 connected to receive a pulse window signal, and an output terminal which is connected to supply a signal to control terminal 46 of delay register 44. Inhibit logic 50 functions to provide an output signal which will disable register 44 only during presence of a pulse window signal at input terminal 53 and only when the signals supplied by comparators 41 and 47 respectively indicate that the moving correlation signal exceeds the correlation threshold signal and the undelayed moving. correlation signal is smaller than the delayed moving correlation signal. Accordingly, register 44 is caused to detect and hold the maximum correlation signal which occurs during a pulse detection window.

Detection logic 54 operates such that after the maximum correlation during a pulse detection window has occurred and a moving correlation signal has fallen below the threshold reference, in effect indicating that the input signal pulse is passing out of the pulse detection window, a pulse detection signal is produced at output 57. This pulse detection signal is supplied over conductor 58 to any suitable utilization apparatus. It is also supplied to a pulse timer 60 through an input terminal 62. Timer 60 also has an input terminal 61 connected to receive timing signals from frequency divider 26.

Timer 60 operates so as to produce a pulse window signal on conductor 63. The pulse window signal has a duration equal to the duration of the pulse detection window, and commences a predetermined length of time after the last detected pulse as indicated by a pulse detection signal at input terminal 62. Conductor 63 supplies the pulse window signal to inhibit logic 50 and to logic circuitry 64 designated as clear correlator logic.

Logic circuitry 64 is operable to supply signals to gates 28 and 31 and counters 38 and 39. It operates such that, following detection of an input signal pulse, a signal is supplied to gates 28 and 31 of sufficient duration to cause accumulators 36 and 37 to be filled with alternate 1 and 0 samples through operation of one-zero generator 35. The signal from logic circuitry 64 is also supplied to the reset terminals of counters 38 and 39, whereby the counts therein are set to 0. This condition, in addition to the existence of identical numbers of 1's and 0's in accumulators 36 and 37, initializes the pulse detection so that it is immediately ready to sense correlation between the input signal and the reference signal.

The pulse as described in U.S. Pat. No. 4,038,540, takes the form as shown in FIG. 2. The regular sine wave as shown in FIG. 2 represents the communication pulse which was transmitted and which it is desired to receive, and the irregular signal on each side of the regular sine wave represents noise. The filtering and clipping circuit converts the signal in FIG. 2 into a square wave as shown in FIG. 3. The correlation signal which is supplied as an output from adder 40 is shown in FIG. 4A and the output of the detector is shown in FIG. 4B. The detection threshold as shown in FIG. 4A is established by the reference input 43 to comparator 41. As described above, because noise occurs in a random manner resulting in random 1's and 0's entering accumulators 36 and 37, on average there will be no net difference in the signals accumulated by the accumulators. Consequently, the counters will respond to noise by maintaining an average count substantially equal to 0. However, as the communication pulse as shown by the regular sine wave in FIG. 2 is received, there will be significant correlation between the received communication pulse and the quadrature reference signals so that a predominant number of 1's or 0's will be present in each accumulator causing the correlation signal as shown in FIG. 4A to increase. As the communication pulse fills the accumulator and begins to be shifted out, the correlation signal will decrease.

Figure 5A:
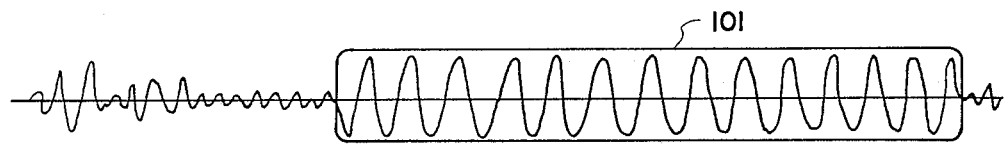
FIGS. 5A and 5B show the uncertainty region of the correlation signal produced by the prior art system.
Figure 5B:
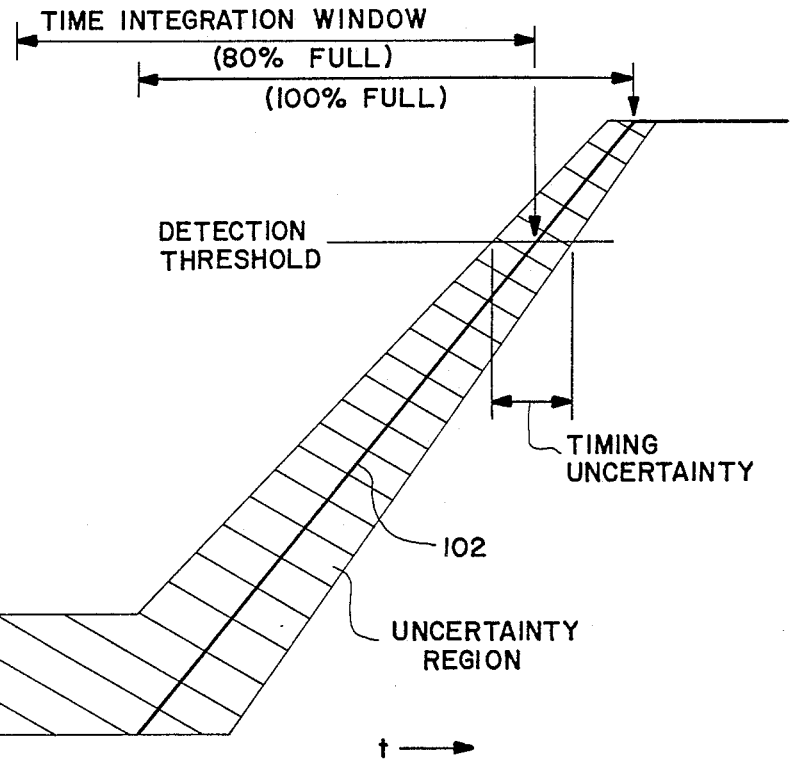

FIG. 5A shows the communication pulse as received by the detector and FIG. 5B shows an expanded view of the leading edge of the correlation signal produced by the detector in response to the communication pulse. FIGS. 5A and 5B taken together show the timing relationship between the received communication pulse 101 and the correlation signal 102 with respect to the timing window. Noise and creates a region of uncertainty, shown by the shaded area, such that the actual correlation signal will fall somewhere within the region.

A characteristic of finite time window correlation processes is that the leading edge of the correlation peak becomes progressively more stable, i.e. less subject to uncertainty, as a signal with the proper characteristics moves into the window. In FIG. 5B, the shaded region, which represents uncertainty, is narrowest at the top of the leading edge.

Function 102 as shown in FIG. 5B represents a correlation signal based upon a communication pulse which is received cleanly, i.e. without noise Detection must be made before the window is totally filled with signals since a detection level set too closely to the maximum achievable level of the pulse will introduce a higher probability of missing the pulse altogether. The uncertainty associated with the time of detection is determined by the width of the shaded uncertainty region at the point of detection.

Figure 7:
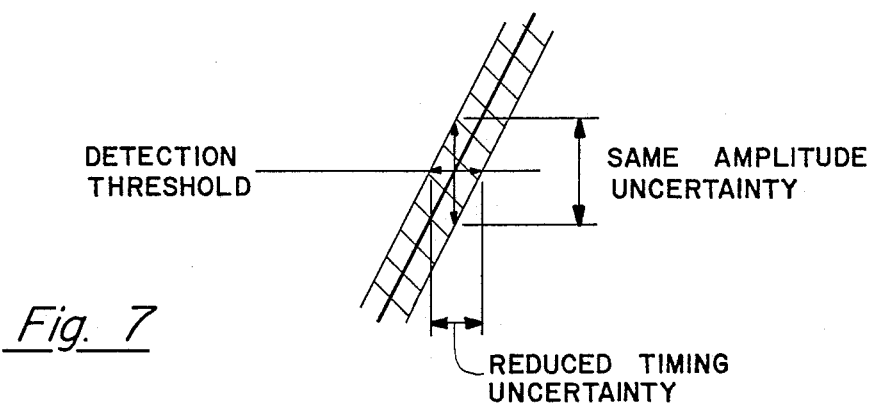

FIG. 6 is an enlarged view of the correlation signal and its shaded area of uncertainty at the point of detection. It can be seen from FIG. 6 that, for a given amplitude uncertainty, there is an associated timing uncertainty a determined by the slope of the leading edge, i.e. the slope of the correlation signal. FIG. 7 shows that with increased slope and the same amplitude uncertainty, the timing uncertainty is reduced. There are two ways of increasing the slope of the correlation signal without impacting receiver complexity—by shortening the integration window or by adjusting the signal characteristic to produce a steeper slope at the detection threshold point of the correlation signal.

The first way, which involves shortening the pulse duration and the integration time of the associated receiver, is the usual method of improving timing resolution. Unfortunately, this way has the negative effect of widening the receivers noise bandwidth. In the sonar beacon signal detection application, in which the present invention may be used, for example, widening the receiver's noise bandwidth reduces the maximum detection range for a given beacon source level. Hence, this particular way is not a desirable alternative for long-range/deep water applications.

The second way is normally accomplished by increasing the complexity of the signal characteristic. In doing so, the bandwidth is increased without shortening the communication pulse. This result is normally referred to as increasing the time bandwidth product. Unfortunately, this method usually also requires an undesirable and impractical increase in the complexity of the receiver process, in that the receiver can no longer look for a simple communication pulse. A matched filter receiver for a complex signal requires a full replica correlation process which may be on the order of twice as complex.

Figure 8A:
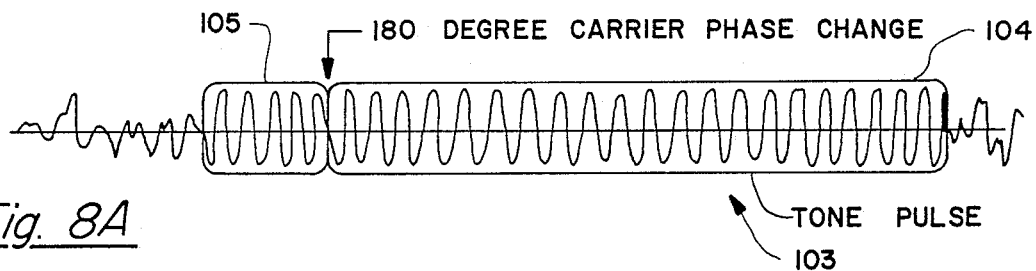
FIGS. 8A and 8B show how a correlation signal of increased slope at the point of detection can be obtained with the present invention.

FIG. 8A illustrates how a tone pulse can be modified according to the present invention to improve the timing uncertainty at the detection threshold of the correlation signal to improve the time-of-arrival detection performance of a communication pulse receiver. The communication pulse is provided with a main pulse portion 104 which may take the form as shown in FIG. 2 and a pre-pulse portion 105 which is of a phase substantially opposite to the phase of the main pulse portion 104. Such a signal may be transmitted by transmitter 10 shown in FIG. 1. Transmitter 10 can be any diphase transmitter arranged to provide the proper timing length ratios between pre-pulse portion 105, main pulse portion 104, and the timing window established by accumulators 36 and 37. FIG. 8A shows an example of the time duration ratio between main pulse portion 104 and prepulse portion 105, and FIGS. 8A and 8B taken together show the relationship between the length of communication pulse 103 and the size of the integration window as established by the clock frequency and the number of storage locations in accumulators 36 and 37.

Figure 8B:
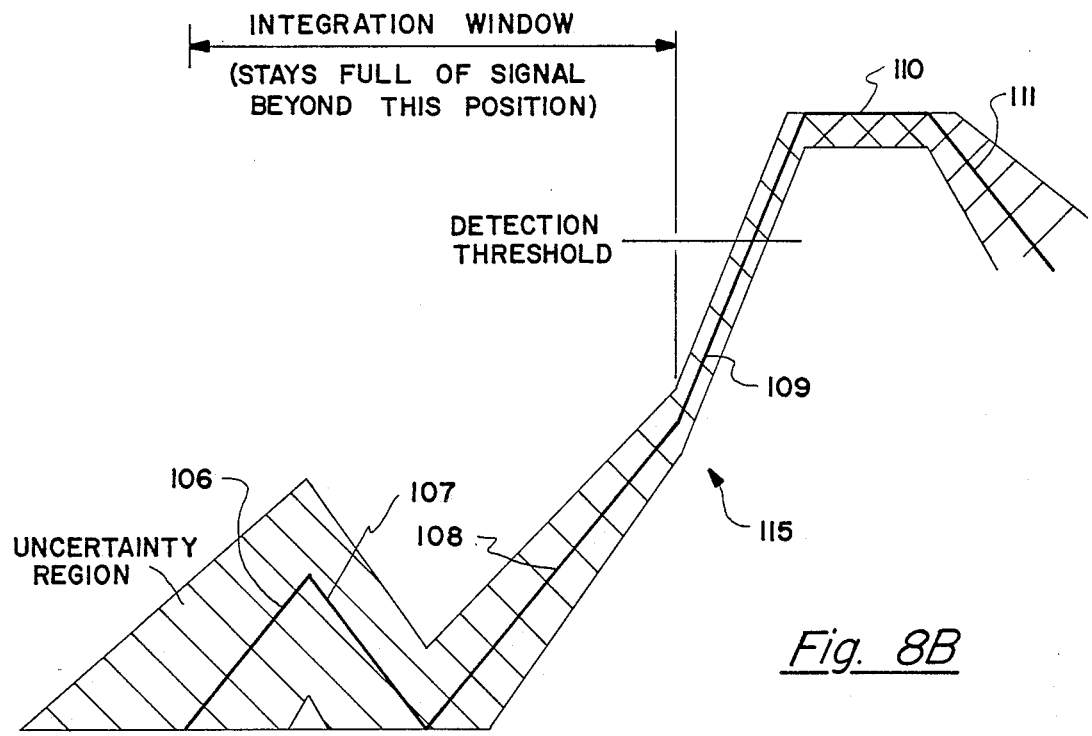

FIG. 8B is a trace showing that as the pre-pulse portion of communication pulse 103 enters the correlator's integration window, i.e. enters the accumulators, the expected output level of the correlation signal provided by adder 40 increases along segment 106. This increase continues until the phase reversal edge enters the window. At this point, the trace decreases along segment 107 because the main pulse portion 104 starts cancelling pre-pulse portion 105, which pre-pulse portion is already in the integration window. The magnitude of this pre-peak occurring at the end of segment 106 is limited to approximately 25 percent of full scale by limiting the time duration of the pre-pulse to 25 percent of the integration window width. The down trend of segment 107, which has a slope equal in magnitude but opposite in sign to the slope of segment 106, continues until it reaches 0, the point at which equal amounts of pre-pulse and main pulse are in the window.

Beyond this point, the correlation output signal 115 increases along segment 108, which has the same slope as segment 106, until the window is totally filled with signal (all of the pre-pulse and some of the main pulse). At this point, the noise-produced output level uncertainty is minimum because the window is as filled with signal as it can get.

After segment 108 the uncertainty stays minimized because the window stays full of signal. However, the absolute level continues to change along segment 109, but at twice the previous rate. This change in rate occurs because as more of the main pulse of consistent phase is added to the window, a corresponding amount of pre-pulse of cancelling phase is lost, thereby doubling the effect of rate of change of the integration window. As the level passes through the detection threshold, a time-of-arrival measurement is made which gains the benefits of the following two effects: (1) the integration window is totally filled with signal so that noise uncertainty is minimized; and (2) the slope of the leading edge is doubled so that the noise uncertainty is halved.

When all of the prepulse has been shifted out of the accumulators, the correlation signal follows segment 110 until no more communication pulse enters the accumulators at which time the correlation signal begins dropping along segment 111. The slope of segments 106, 107, and 108 may be referred to as the first slope and the slope of segment 109 may be referred to as the second slope.

In another aspect of the invention, an unbiased measurement of the pulse time-of-arrival is derived by determining the midpoint between the leading and trailing edge detection points, as indicated in FIG. 9. Under noiseless conditions, the receiver output for a simple communication pulse input, such as that shown in FIG. 2, will have the idealized waveform 121 shown in FIG. 9. As the signal-to-noise ratio decreases, the effect of the expected (average) output will be to reduce the peak level and the leading and trailing edge slopes as indicated by waveform 122. The uncertainty band will be centered about this expected wave form 122. The expected threshold crossing of the leading slope edge occurs later than in the noiseless case and is signal-to-noise ratio dependent. This bias develops on the trailing edge as well and, on the average, is equal in magnitude but opposite in polarity to the leading edge bias such that the amount of uncertainty can be reduced by determining the midpoint between the positive and negative going intersections of the correlation signal with the detection threshold. Another benefit from determining pulse arrival from both the leading and trailing edge measurements is that the combined measurements, given that they contain independent noise jitter components, result in a combined measurement noise jitter which is approximately 30 percent lower than the noise on either individual measurement.

Figure 1B:
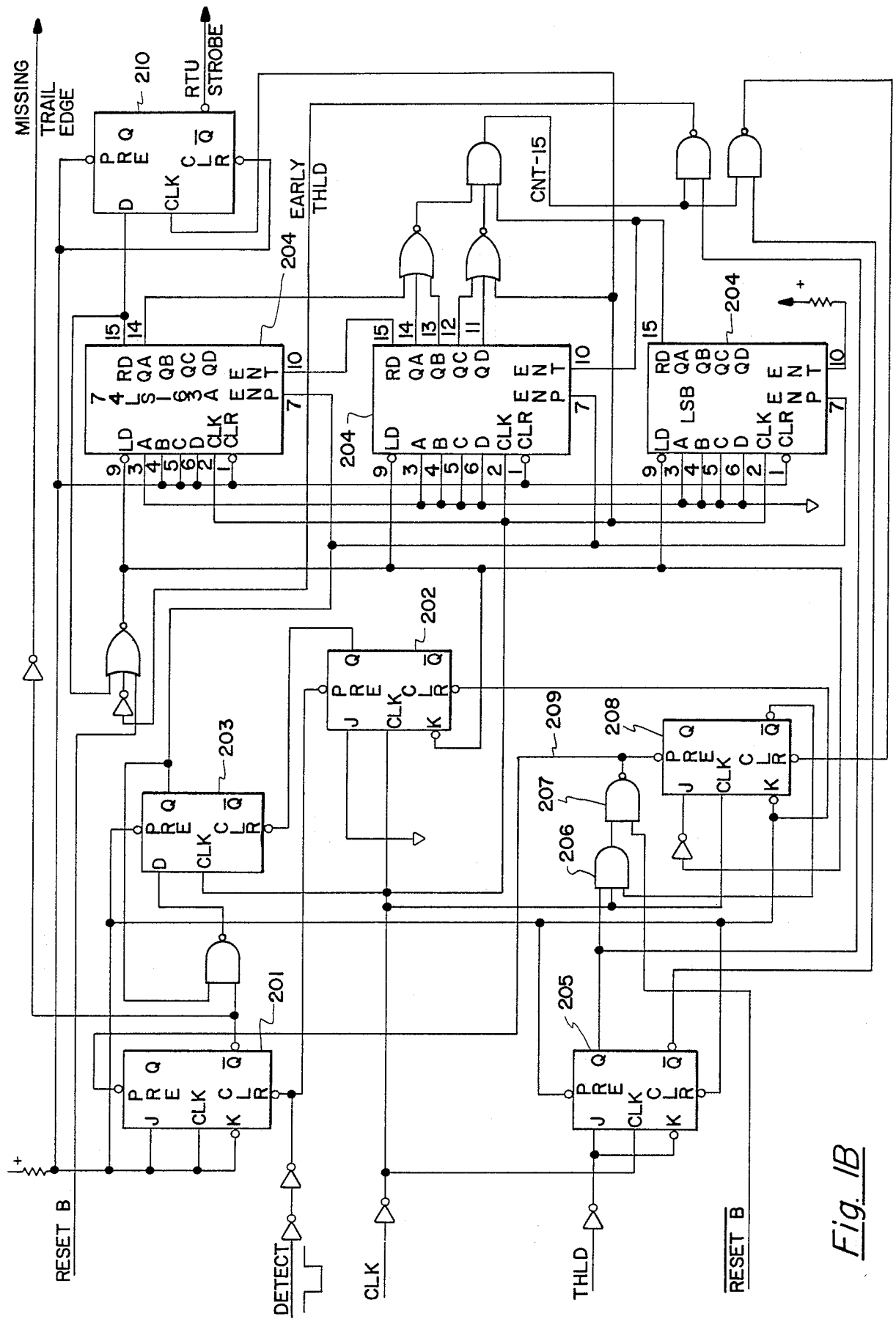

FIG. 1B shows the circuitry for determining the midpoint of the received communication pulse. As the signal DETECT goes low indicating the beginning of a received communication pulse, flip-flop 201 is cleared which drives its inverted Q output high and flip-flop 202 is set which drives its Q output high. When flip-flop 202 switches, the clear signal is removed from flip-flop 203 allowing it to be clocked to cause counter 204 to begin counting at half rate.

At the same time, the THLD signal goes high which signal is delayed by flip-flop 205 for synchronization purposes and then operates through AND gate 206, NAND gate 207, and flip-flop 208 to generate a trailing edge signal on line 209. If the trailing edge of the communication pulse arrives before counter 204 reaches a count of 16, the detector is reset on the assumption that a spurious pulse was received. Thus, a holding period is built into the detector to insure that the detector will not respond to spurious signals. However, if the counter reaches a count of 16 before the trailing edge signal on line 209 is generated, the counter continues to count at the half rate until the trailing edge signal appears on line 209.

When this signal appears after the count of 16, flip-flop 201 is set to 0 on its inverted output which disables the divide-by-two opera ion of flip-flop 203 allowing the counter to count at full rate. Counter 204 will continue to count at full rate until it reaches a full count at which point flip-flop 210 is switched to generate the signal RTU STROBE.

At the beginning of each cycle of operation, the counter is preset to a count of 3584 and then counts up from there. Counter 204 and the clock frequency are arranged so that the counter takes 1 ms to reach a full count of 4095 from the preset count of 3584 counting at the full rate and takes 2 ms to reach a full count of 4095 (all ones, in binary) counting at the half rate. By this arrangement and by counting at half rate until the detection of the trailing edge after which the counter counts at full rate until the full count is reached, the signal RTU STROBE will always be generated 1 ms after the midpoint of the received communication pulse. The midpoint can, therefore, be accurately determined by the detector.

As an example, if the signal THLD goes high at time 0 and stays high for 1 ms indicating a received communication pulse of 1 ms duration, counter 204 will count at half rate for as long as the signal THLD remains high, i.e. 1 ms. At this point the counter is only half full since it has counted at half rate for only 1 ms. When the signal THLD goes low (at the end of 1 ms), the counter will count at its full rate until the counter becomes full, a process which will take ½ ms since it is now counting at full rate and since it was only half full. The midpoint of the received communication pulse occurs 1 ms before the point at which the counter becomes full (½ ms during which the counter counts at its full rate and ½ of the time that the counter counts at its half rate).

Figure 1C:
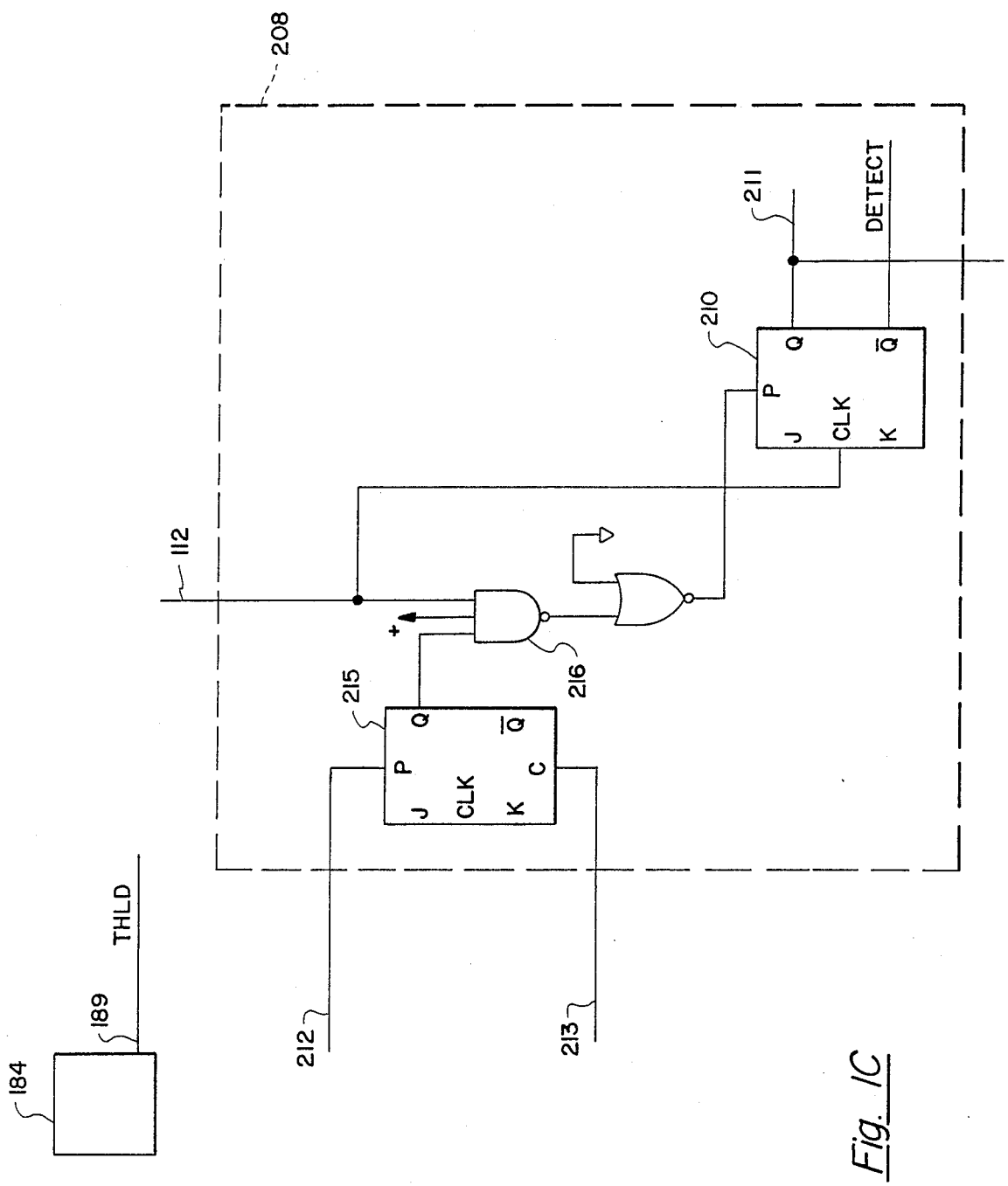

FIG. 1 shows the modifications of the circuit 208 shown in U.S. Pat. No. 4,038,540 to generate the DETECT signal and from where the THLD signal can be derived, which signals are used to detect the midpoint of the received communication pulse.

This time-of-arrival determination can be further enhanced by using a communication pulse with both a pre-pulse portion and a post-pulse portion so that the down trend segment (111 as shown in FIG. 8B) has a slope equal in magnitude to the slope of the increased slope segment (109 as shown in FIG. 8B) but opposite in sign and by taking a time average of where the correlation signal crosses the detection threshold both in the positive going sense and in the negative going sense.

By providing both pre and post pulses to the main pulse shown in FIG. 8A, this time-of-arrival technique can be made more accurate.

Figure 10A:
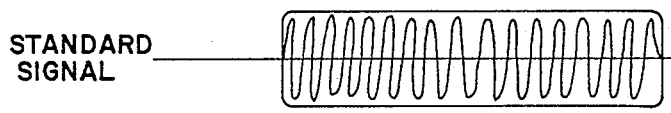
Figure 10B:
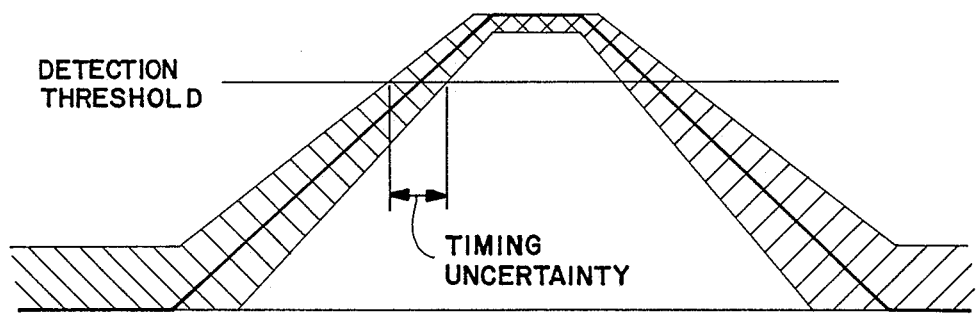

Accordingly, FIG. 10A shows the standard tone pulse as shown in FIG. 2. FIG. 10B shows the correlation signal which is produced by the receiver shown in FIG. 1 in response to the communication pulse shown in FIG. 10A. FIG. 11A shows a communication pulse 130 having a pre-pulse portion 131 and a post-pulse portion 132. FIG. 11B shows the correlation signal which results from the us of communication pulse 130. By comparing FIGS. 11B and 8B, it can be seen that the first half of the correlation signal is the same due to the pre-pulse portion 131. The other half of the correlation signal shown in FIG. 11B, i.e. the portion of the curve following the flat portion, is the same as the first half shown in FIG. 11B except opposite in sign because of post-pulse portion 132. As can be seen, the slope of the curve just following the flat portion is equal in magnitude but opposite in sign to the slope of the curve just before the flat portion.

In response to the correlation signal the comparator produces the signal shown in FIG. 12A which is then averaged to produced the signal of FIG. 12B. Thus, timing noise jitter can be halved because the slopes of both the leading and trailing edges are doubled, timing noise jitter can be reduced because both leading and trailing edge detection time measurements to estimate the mid-pulse point are utilized, and signal-to-noise dependent timing bias error is cancelled by taking advantage of the mirror image symmetry of the leading and trailing edge detection bias error components.

Furthermore, an added benefit derived from the positive control of the trailing edge of the detected pulse is that of resistance to multipath elongation which can be produced from multipath reflections of the primary communication pulse. FIG. 13A shows the primary communication pulse and FIG. 13B shows a reflected multipath pulse. These pulses at the receiver appear, as is shown in FIG. 13C, as the sum of the direct pulse and a multi-path pulse. FIG. 13D shows the resulting correlation pulse which can result in two detection pulses for one communication pulse rather than one detection pulse for one communication pulse.

Figure 14A:
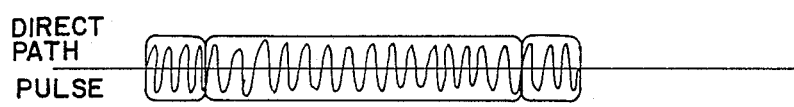
Figure 14B:
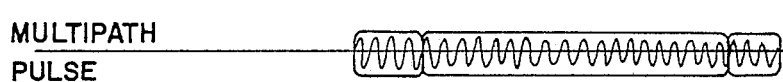
Figure 14C:
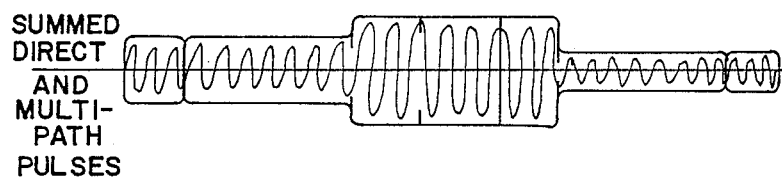
Figure 14D:
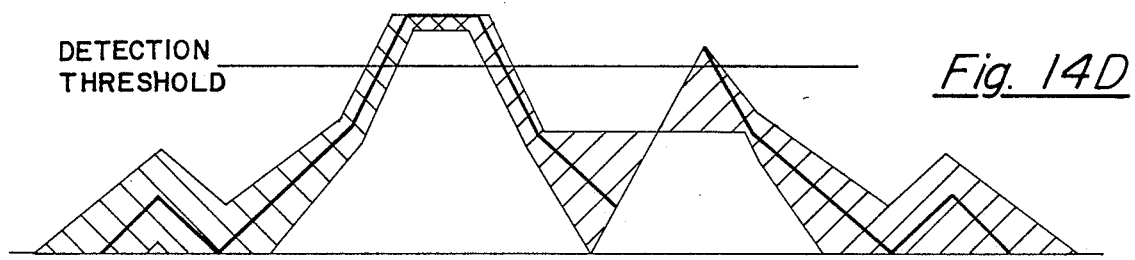

FIG. 14A shows a communication pulse with both a pre-pulse portion and a post-pulse portion. FIG. 14B shows a multipath pulse which is a reflection of the primary direct path pulse. FIG. 14C shows the resulting pulses that appear at the receiver. FIG. 14D shows the resulting correlation signal from the received pulse shown in FIG. 14C. As can be seen, the signal shown in FIG. 14B will result in only one detection pulse.

The embodiments of the invention in which an exclusive property of right is claimed are defined as follows:

1. A detector for detecting a communication pulse, having a main pulse portion and at the edges thereof at least a single edge pulse portion which in substantially opposite in phase with respect to said main pulse portion, in the presence of noise comprising:

receiving means for receiving said communication pulse;

quadrature reference signal source means for producing first and second quadrature reference signals;

multiplier means connected to said receiving means and to said quadrature reference signal source means for multiplying said received communication pulse and said first and second quadrature reference signals, said multiplier means providing a multiplier output signal;

clock means for supplying clock pulses;

correlation signal means connected to said multiplier means and including accumulator means, said accumulator means, responsive to said clock pulses to shift through said multiplier output signal and having fewer storage locations than would be required to store all of a signal as long as said communication pulse, said correlation signal means providing a correlation signal having sloped leading and trailing edges, said correlation means being effective for producing a steeper slope in said leading and trailing edges corresponding to each said edge pulse portion; and, comparator means connected to said correlation signal means for providing a pulse detection output signal when said correlation signal crosses a predetermined threshold, said threshold being set at a level to detect the leading and trailing edges of said correlation signal, said comparator means comprising means for detecting the intersection of both leading and trailing edges of said correlation signal with said predetermined threshold.

2. The detector of claim 1 wherein said communication pulse has a main pulse portion, a pre-pulse portion, and a post-pulse portion, said pre-pulse portion and said post-pulse portion are substantially opposite phase to said main pulse portion, said correlation signal means providing a correlation signal having increased slopes in a positive sense and in a negative sense as a result of said communication pulse, said comparator means comprising means for detecting the intersection of both the positive and negative slopes of said correlation signal with said predetermined threshold.

3. The detector of claim 2 wherein said comparator means comprises means for determining the midpoint between said intersections for determining a time of arrival for said pulse.

4. The detector of claim 3 wherein said midpoint determining means comprises counter means for counting clock pulses at half rate while said correlation signal is above said threshold and, when said correlation signal falls below said threshold, for counting at full rate until said counter is full.

* * * * *

UNITED STATES PATENT AND TRADEMARK OFFICE
CERTIFICATE OF CORRECTION

PATENT NO. : 4,972,441

DATED : November 20, 1990

INVENTOR(S) : JAMES L. ROBERTS, JOHN F. RICHARDSON

It is certified that error appears in the above-identified patent and that said Letters Patent is hereby corrected as shown below:

Column 10, line 7, cancel "in" and substitute --is--.

Signed and Sealed this

Eighth Day of December, 1992

Attest:

DOUGLAS B. COMER

Attesting Officer

Acting Commissioner of Patents and Trademarks